United States Patent [19]

Waters

[11] Patent Number: 4,488,669

[45] Date of Patent: Dec. 18, 1984

[54] TRUCK TOOL BOX

[76] Inventor: John E. Waters, 8504 Gladedale Dr., Waco, Tex. 76710

[21] Appl. No.: 516,775

[22] Filed: Jul. 25, 1983

[51] Int. Cl.³ .............................................. B65D 43/16
[52] U.S. Cl. ................................. 224/273; 224/42.42; 312/DIG. 33
[58] Field of Search ............ 224/273, 309, 311, 42.42; 280/769; 296/37.6; 220/468, 72; 312/DIG. 33

[56] References Cited

U.S. PATENT DOCUMENTS 3,854,621 12/1974 Parry .............................. 296/37.6 X
3,987,829 10/1976 Leone ............................... 220/72 X
4,288,011 9/1981 Grossman ......................... 224/42.42

Primary Examiner—Steven M. Pollard
Attorney, Agent, or Firm—Crutsinger, Booth & Ross

[57] ABSTRACT

A nonmetallic container adapted for use as a tool or utility box in a pickup truck which is preferably unitarily constructed of linear high-density polyethylene and is adapted to fit both standard and compact pickup trucks.

15 Claims, 9 Drawing Figures

TRUCK TOOL BOX

TECHNICAL FIELD

The present invention relates to improvements in nonmetallic containers primarily for use as tool or utility boxes in pickup trucks. The improved tool or utility box of the present invention is unitarily constructed of non-metallic material such as high density polyethylene and is adapted to fit both standard and compact pickup trucks. The subject tool boxes are attractive, waterproof, strong, lightweight, durable, rust-resistant, and relatively inexpensive to manufacture.

BACKGROUND ART

Pickup trucks comprise a large portion of the vehicles currently in use. One problem present in pickup trucks is that a minimum amount of enclosed space is provided for the protection and storage of tools and other valuable items. To provide for storage and transportation of items in a pickup truck, it is common to use tool or utility boxes which fit between the side panels behind the cab. In the past, these boxes were commonly made from metallic materials by use of welded construction. However, the metal boxes are subject to rust and corrosion, particularly when used in coastal localities or when used for storing substances that are reactive with metals.

More recently, to avoid these corrosion problems, tool or utility boxes have been manufactured from non-corrosive thermoplastic polymers such as high-density polyethylene. Two such containers are marketed under the tradenames NEVR-RUST TOOL-TAINER and ROUGHRIDER by Nevr-Rust Tool-Tainer, Inc. and by Cardinal American, respectively.

The first container is disclosed in U.S. Pat. No. 4,288,011 and employs telescoping members with underlying support means. The telescoping members permit the width of the box to be adjusted so as to accommodate different width beds. The underlying support means are required because of the loss in strength and rigidity which is experienced through use of the telescoping members.

The second container apparently employs a one piece molded tub-like bottom to which a lid assembly comprising two hinged covers is subsequently mounted.

Both of the prior art containers employ covers having hinged end portions that are upwardly inclined relative to the horizontal plane extending between the tops of the pickup side panels. These inclined covers partially obstruct the vision of the pickup operator through the rear window, particularly during backing, and are therefore hazardous to use. Furthermore, both containers have covers that are reinforced by raised outside edges and longitudinal trusses. These design features are undesirable because they tend to trap water, dirt and other debris, and spoil the outward appearance of the containers. Also, because the covers are not mounted flush with the web portion disposed between them, the hinges are more easily knocked out of alignment or broken when other objects or materials are hauled in the same pickup bed.

SUMMARY OF THE INVENTION

A tool or utility box is provided which can be simply and easily molded from a nonmetallic material to fit various sizes and models of pickup trucks. The tool boxes of the invention are characterized by their strong unitary construction and their low profile. This low profile is achieved by recessing the lids in such manner that the top of the lids and the web portion of the container extending therebetween form a flat and substantially continuous upper surface when the lids are in the closed position.

According to a preferred embodiment of the invention, a tool box for use with pickup trucks is provided that comprises hinged covers having recessed hinges with dual lid springs for controlled lid opening. According to yet another embodiment of the invention, a tool box for use with pickup trucks is provided that comprises a unitary, molded thermoplastic container having bottom and end portions that further comprise a plurality of spaced apart longitudinal ribs.

According to yet another embodiment of the invention, a molded thermoplastic pickup tool box is provided which comprises recessed lower end portions adapted to accommodate the wheel wells of a compact pickup.

According to yet another embodiment of the invention, a nonmetallic container having pivotally hinged lids on both ends thereof and an adjustable lock assembly adapted to separately engage each lid in its closed position is provided.

According to yet another embodiment of the invention, a pickup tool box is provided that comprises hinged lid portions having a double wall construction wherein a portion of the inner wall is bonded to the outer wall and a portion of the inner wall is spaced apart from the outer wall.

Other objects and improvements of the invention will be explained in more detail below.

BRIEF DESCRIPTION OF THE DRAWINGS

For a full understanding of the preferred embodiment of the present invention, reference may be had to the following detailed description taken in conjunction with the accompanying drawings in which.

Like numerals are used to designate like parts in all figures of the drawings.

DETAILED DESCRIPTION

Figure 1:
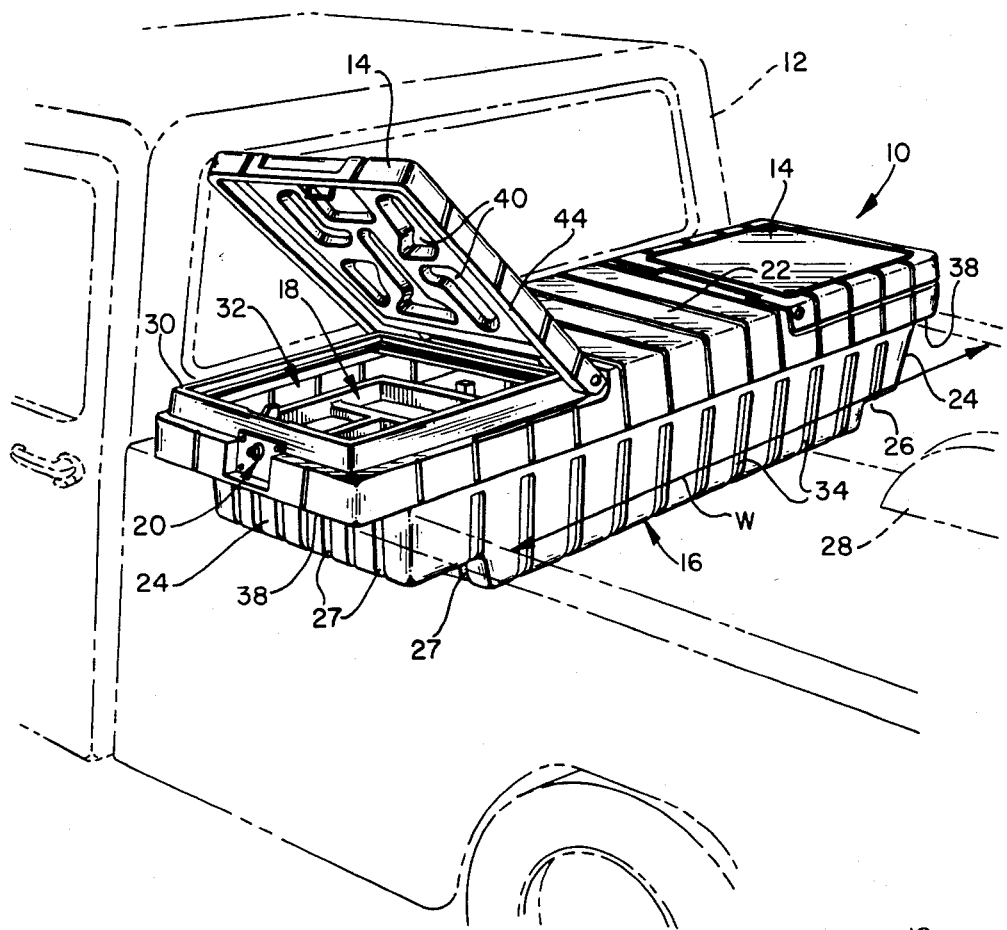
FIG. 1 is a perspective view of the pickup truck tool box of the present invention showing the box installed in a bed of a pickup truck shown in phantom lines.
Figure 2:
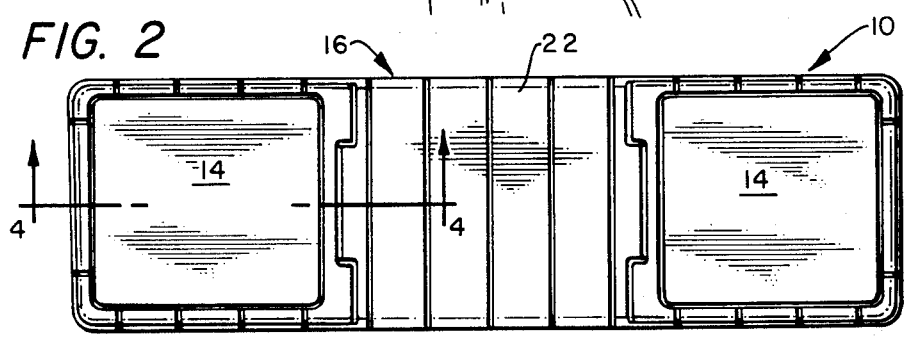
FIG. 2 is a plan view of a preferred embodiment of the container, of the present invention.
Figure 3:
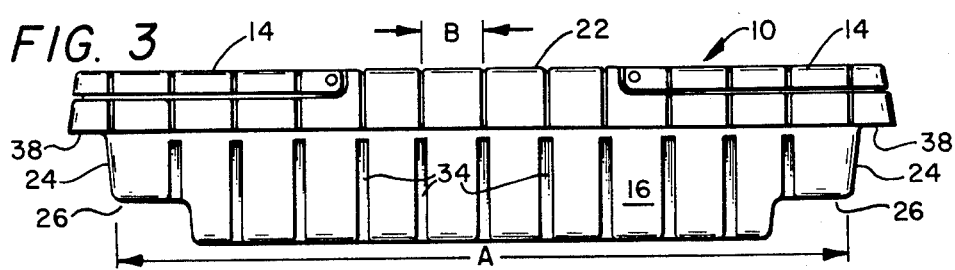
FIG. 3 is an elevation view of the container of the present invention.

Referring now to the drawings, FIG. 1 depicts a tool or utility box assembly which for purposes of description is identified as reference numeral 10. In FIG. 1, the box 10 is shown installed in the bed of a pickup truck 12 which is shown in phantom lines. The interior width of the bed of the pickup truck 12 is shown as W. Box 10 rests on the upper surfaces of the side panels of the pickup truck bed and bridges the distance W therebetween. Box 10 is anchored in position by suitable means such as screws and is utilized to supplement the space available within the pickup truck for carrying tools and the like. The box 10 shown in FIG. 1 has a pair of self-sealing lids 14 which are pivotally connected to body 16 of box 10 to provide access into the interior of the box. As will be described hereinafter in detail, box 10 is preferably provided with tray assembly 18 slidably disposed within body 16 and with latch assembly 20 for selectively locking the lids 14 in a closed position.

Referring to FIGS. 1–5, box 10 is unitarily formed from a nonmetallic material. A preferred nonmetallic material for use in forming box 10 is polyethylene, and more particularly, linear high-density polyethylene. Linear high-density polyethylene is a thermoplastic material having a molecular weight of about 6,000 or more. Linear high-density polyethylene is an excellent barrier to water vapor and moisture, has a tensile strength of about 4,000 psi, an impact strength of about 8 foot-pounds per inch of notch, and good electrical resistivity. Although linear high-density polyethylene is a preferred polymer for use in the tool box of the invention, it should be understood that other polymers, copolymers, terpolymers, polymeric laminates and the like can also be used within the scope of the invention.

Body 16 preferably further comprises a central portion 22 joining two integrally formed spaced end portions 24. Each end portion 24 preferably has a wheel well clearance relief 26 to prevent interference with the wheel well 28 of the pickup truck bed. This feature is particularly desirable where box 10 is intended for use in a compact pickup having a relatively short wheelbase and bed length. Each end portion 24 has an endless upwardly facing sealing surface 30 extending around the periphery of an opening 32. As will be described in more detail hereinafter, this seal surface 30 cooperates with a seal carried in lid 14 to seal the opening 32 when the lid is in a closed position.

Figure 4:
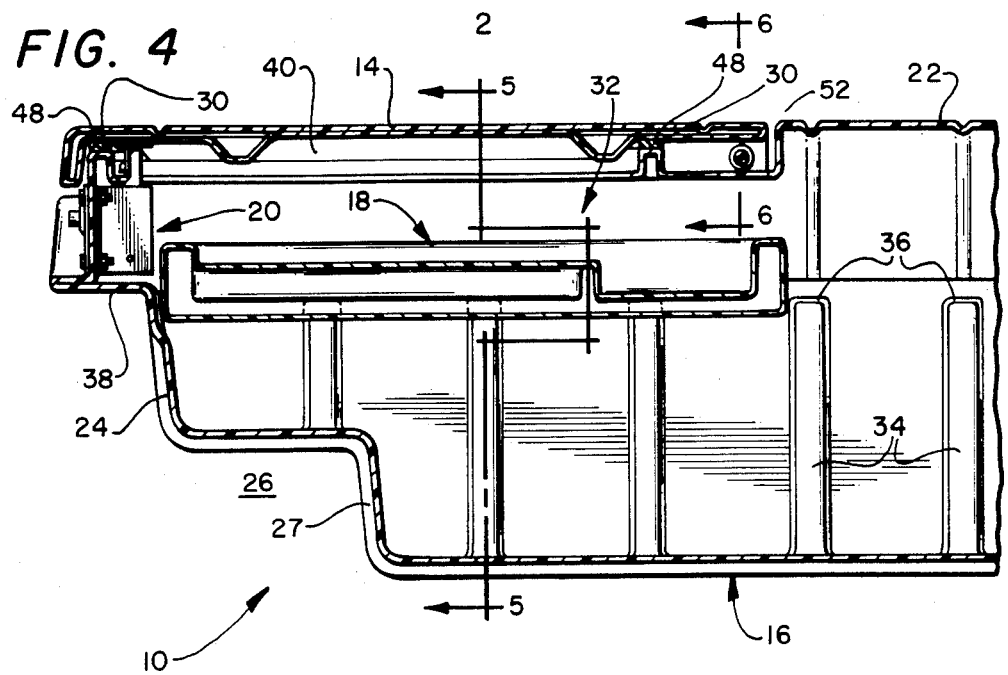
FIG. 4 is a sectional elevation view taken along line 4—4 of FIG. 2 looking in the direction of the arrows.
Figure 5:
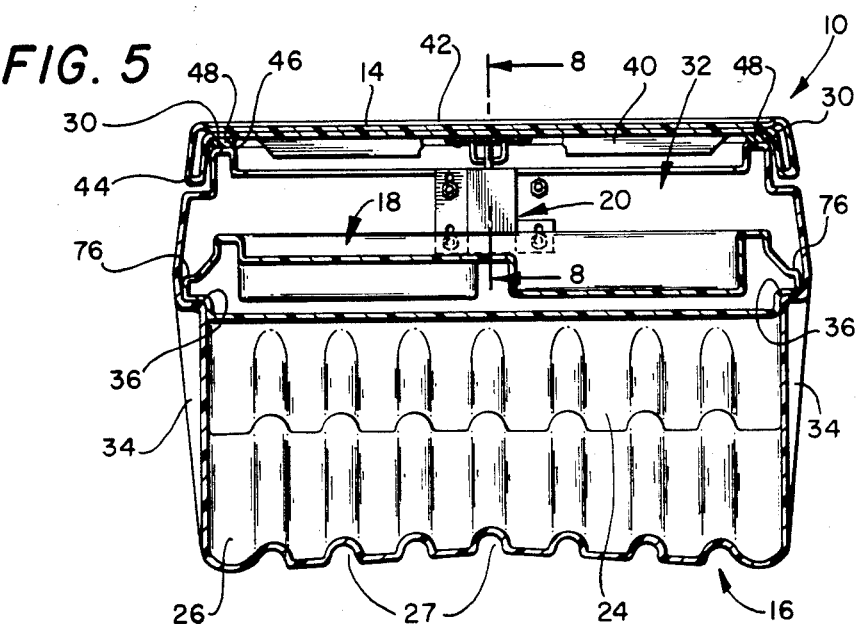
FIG. 5 is a sectional elevation view taken on line 5—5 of FIG. 4 looking in the direction of the arrows.

The end portions 24 and central portion 22 are provided with a plurality of spaced ribs 27, 34 which are integrally formed in the bottom and sides of body 16. As seen in FIGS. 1, 4 and 5, spaced ribs 27 extend longitudinally along the bottom and end portions of body 16. As seen in FIGS. 1, 3, 4 and 5, ribs 34 are spaced along the length of body 16 and extend in a direction that is substantially vertical when box 10 is installed in the pickup truck as shown in FIG. 1. Ribs 27, 34 add structural integrity and rigidity to the container. Each rib 34 also has an upper surface which forms an inwardly extending shoulder on the interior of the body 16. The shoulders 36 of each of the ribs 34 are aligned and cooperate to act as a guide or support surface for the tray 18 as can be seen in FIGS. 4 and 5. Ribs 23 in central portion 22 extend transversely across box 10 at spaced intervals which generally correspond to the spacing of ribs 34.

According to a particular feature of the present invention, body 16 is designed with a downwardly facing flange or shoulder 38 which rests on the upper surface of the side panels of the pickup bed. On the inward side of shoulder 38 body 16 has a portion which extends down into the pickup truck bed as shown in FIG. 1. This portion has a maximum length, shown in FIG. 3 as dimension A, which should preferably not exceed the width of the pickup bed with which box 10 is intended to be used. According to a particular feature of the present invention, the dimension A of box 10 can be simply and easily varied to produce tool boxes adapted to fit pickup trucks of various widths W without requiring a separate mold for each different width. This can be accomplished by selecting the dimension B which is the center line distance between the ribs 23 to be such that by adding or removing sections of length B from the mold, the resultant lengths will fit pickup trucks currently on the market. Thus, the ribs 23, 27, 34 serve a combined three-fold function of improving rigidity and crush resistance of the containers, providing an upper surface or shoulder 36 on which to support tray 18, and breaking the continuity of the surface of the central portion 22 so that inserts or sections can be added to or subtracted from the mold without detracting from the surface appearance of the box itself.

According to a preferred embodiment of the present invention, lids 14 are likewise formed from a nonmetallic material such as high-density polyethylene and are each unitarily molded. Accordingly, as can be seen in FIG. 4, each lid 14 is a doubled wall structure having a plurality of indentations 40 in the underside thereof in which the upper and lower walls of the lid 14 are fused together for structural integrity. Each lid 14 has a central portion 42 which is bounded on three sides by flange 44. A sealing surface 46 carries a flexible seal 48 thereon and is positioned to extend around the interior surface of the lid 14. Seal 48 can be constructed from a flexible rubber material or the like and is positioned to correspond and mate with the sealing surface 30 of body 16 when the lid is in the closed position shown in FIGS. 4 and 5. This seal 48 aids in preventing moisture from entering box 10 and thereby reduces the likelihood that articles stored inside the box will rust, corrode, or otherwise damaged by the moisture. Lids 14 are preferably mounted flush with the upper surface of central portion 22 to provide a low profile for the container.

Figure 6:
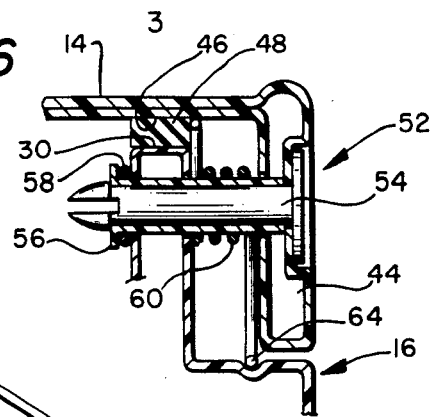
FIG. 6 is a sectional detail view of one hinge assembly as installed in the tool box of the present invention so as to pivotally connect one side of a lid to the body of the box.
Figure 7:
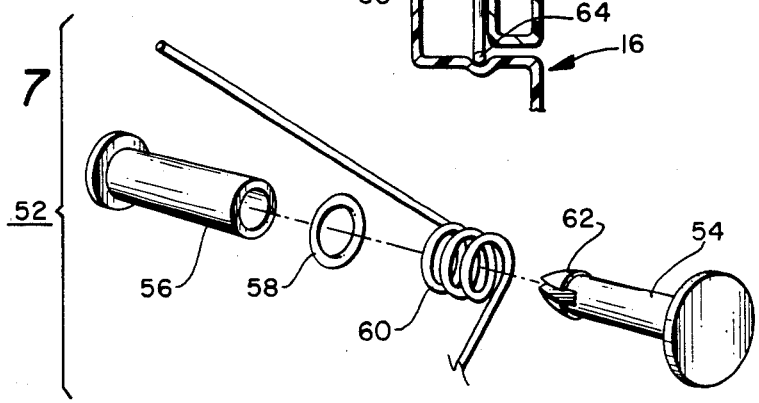
FIG. 7 is an exploded view of the hinge assembly shown in FIG. 6.

Dual hinge assemblies 52 pivotally connect each lid 14 to body 16. Each hinge assembly 52 is positioned outside of the continuous sealing surface 30. The details of hinge assembly 52 are described in relation to FIGS. 6 and 7. Each hinge assembly 52 comprises a shaft 54 which telescopes into and snaps in position in a sleeve 56. As can be seen in detail in FIG. 6, sleeve 56 is first inserted through aligned openings in a flange formed on body 16 and then through aligned openings in flange 44 on lid 14. Sleeve 56 has a shoulder which is utilized to capture and compress an O-ring 58 against the interior surface of the flange on body 16 as shown in FIG. 6. A spring assembly 60 is disposed between lid 14 and body 16 and slidably engages the outside surface of sleeve 56. Shaft 54 has a bifurcated locking end 62 which holds the shaft in position and locks it to sleeve 56 when shaft 54 is forced into sleeve 56 as shown in FIGS. 6 and 7. One end of spring assembly 60 rests in a groove 64 formed in the upper surface of body 16 and the other end contacts the lid to resiliently urge the lid to the open position. Thus, when lid assembly 20 is released, lid 14 will remain in the open position by reason of the resilient force of spring 60.

Figure 9:
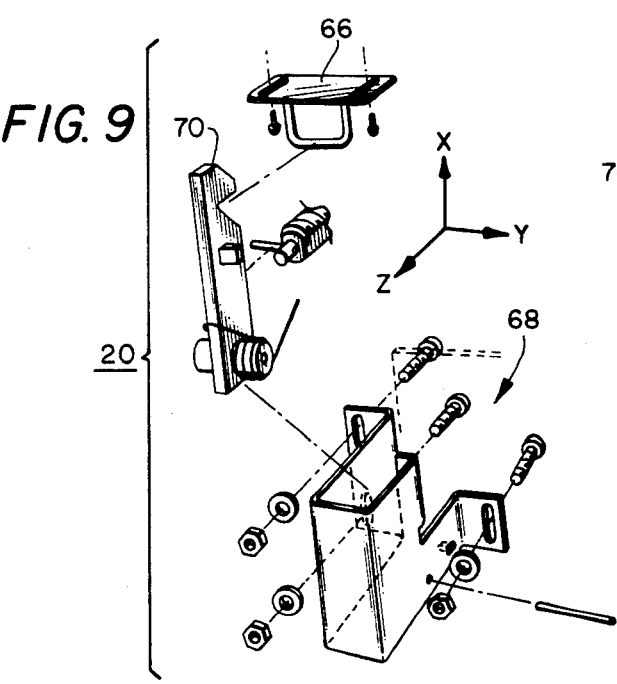
FIG. 9 is an exploded view of the lock assembly with a container of the present invention.
Figure 8:
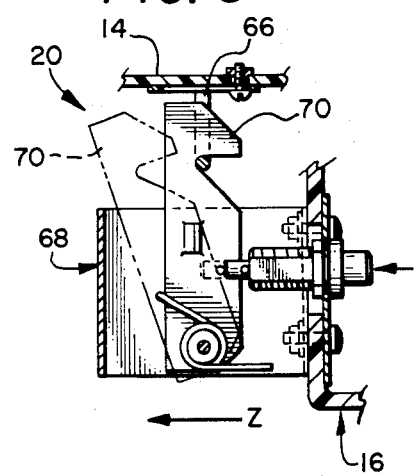
FIG. 8 is a sectional view taken on line 8—8 of FIG. 5 looking in the direction of the arrow showing the lock structure.

Latch assembly 20 is described in further detail in relation to FIGS. 8 and 9. According to a particular feature of the present invention, latch assembly 20 is adjustable in three separate directions identified by coordinants X, Y and Z in FIG. 9. As can be seen in FIG. 8, lid 14 further comprises a metallic U-shaped catch 66 having a slotted base portion that is adjustably mounted on the inside surface thereof at the end opposite hinge assemblies 52 by use of fasteners such as screws, or the like. The slots allow catch 66 to be variably positioned in the direction of arrow Z for proper alignment with locking mechanism 68. Locking mechanism 68 is mounted on the front wall of body 16 and is provided with suitable slots for adjustment in the direction of arrows X and Y. Locking mechanism 68 is of a type which is commercially available and can be provided with a spring loaded rachet 70 which engages the catch 66 to hold lid 14 in a closed position. Locking mechanisms of this type are presently available or well known to those of ordinary skill in the art.

Tray 18 can likewise be molded from a polymeric material and is preferably provided with a flange 76 extending along each side thereof. Flanges 76 are shaped so that when the tray is in the position shown in FIG. 5, flanges 76 will rest on shoulders 36 and can slidably engage the upper surface of shoulders 36 from end to end within tool box 10.

It will be understood, of course, that the disclosure herein relates only to the preferred embodiment of the present invention, and that numerous alterations, changes and modifications can be made in the apparatus disclosed herein without departing from the spirit and scope of the invention as claimed below.

What is claimed is:

1. A nonmetallic container adapted for use as a crossbed tool or utility box in a pickup truck, said container adapted to be supported by the upper surfaces of the side panels of a pickup truck and to bridge the space therebetween without intermediate support; said container comprising a unitarily molded polymeric body portion further comprising integrally formed bottom, side and end wall portions, an upwardly directed opening at each end of said body portion to provide access to the interior thereof, and an integrally formed central portion spanning the side walls between said openings; lid means disposed over each of said openings, said lid means being pivotally connected to said body portion by recessed hinge assemblies disposed at either side thereof so as to permit said lid means to cover said openings when in a lowered position and to provide access to said openings when in an upwardly inclined position, said lid means and said body portion being further adapted to provide sealing engagement therebetween when said lid means is in said lower position, and said lid means being pivotally connected to said body portion in such manner that when said lid means is in said lower position, the top of said lid means and said integrally formed central portion of said body portion cooperate to provide a substantially horizontal surface spanning the top of said container.

2. The apparatus of claim 1 wherein said body portion further comprises a plurality of spaced continuous longitudinal ribs traversing the bottom and end portions thereof.

3. The apparatus of claim 1 further comprising a plurality of spaced, substantially vertically extending ribs along the sides thereof.

4. The apparatus of claim 3 wherein said top wall portion of said body portion further comprises an upwardly facing web portion centrally disposed between said openings, said upwardly facing web portion further comprising a plurality of spaced ribs extending transversely across said body portion, said transverse ribs being substantially aligned with at least some of said vertically extending ribs on the sides of said body portion.

5. The apparatus of claim 3 wherein said vertically extending ribs on the sides of said body portion further comprise an inwardly extending shoulder portion.

6. The apparatus of claim 5, further comprising at least one molded polymeric tray adapted to be inserted through one of said openings into the interior of said body portion, and being further adapted by flange portions disposed along the sides thereof to slidably engage said inwardly extending shoulders of said vertically extending ribs.

7. The apparatus of claim 1 wherein each lid means is molded with double wall construction.

8. The apparatus of claim 7 wherein said iid means comprises an outside wall and an inside wall and wherein a portion of said inside wall is spaced apart from said outside wall and a portion of said inside wall is bonded to said outside wall.

9. The apparatus of claim 1 wherein said body portion further comprises wheel well clearance relief at each end thereof to accommodate the wheel wells of a pickup truck.

10. The apparatus of claim 1, further comprising an adjustable latch assembly disposed at each end thereof, each said latch assembly being adapted to reversibly fasten the outwardly extending end of said lid means to said body portion when said lid means is in a lowered position.

11. The apparatus of claim 1 wherein said lid means and said body portion further comprise flange portions having aligned openings disposed therein for receiving said hinge assemblies, and wherein said hinge assemblies each further comprise a sleeve and a shaft adapted to telescope and lock into said sleeve.

12. The apparatus of claim 11 wherein each said hinge assembly further comprises a spring assembly adapted to resiliently urge said lid means to an upwardly inclined position.

13. The apparatus of claim 12 wherein the upper surface of said body portion further comprises a groove adapted to receive a portion of said spring assembly.

14. The apparatus of claim 1 wherein said body portion and said lid means comprise a molded thermoplastic polymeric material.

15. The apparatus of claim 14 wherein said thermoplastic polymeric material is linear high-density polyethylene.

* * * * *